US009405798B2

(12) United States Patent
Levi

(10) Patent No.: US 9,405,798 B2
(45) Date of Patent: Aug. 2, 2016

(54) RAPID NEAREST NEIGHBOR SEARCHING USING KD-FERNS

(71) Applicant: GM GLOBAL TECHNOLOGY OPERATIONS LLC, Detroit, MI (US)

(72) Inventor: Dan Michael Levi, Kyriat Ono (IL)

(73) Assignee: GM Global Technology Operations LLC, Detroit, MI (US)

( * ) Notice: Subject to any disclaimer, the term of this patent is extended or adjusted under 35 U.S.C. 154(b) by 680 days.

(21) Appl. No.: 13/908,292

(22) Filed: Jun. 3, 2013

(65) Prior Publication Data

US 2014/0358960 A1    Dec. 4, 2014

(51) Int. Cl.
*G06K 9/00* (2006.01)
*G06F 17/30* (2006.01)

(52) U.S. Cl.
CPC ............... *G06F 17/30495* (2013.01)

(58) Field of Classification Search
CPC .............................................. G06F 17/30495
See application file for complete search history.

(56) References Cited

U.S. PATENT DOCUMENTS

| 6,380,934 | B1 * | 4/2002 | Freeman | G06K 9/00624 345/419 |
| 2011/0307838 | A1 * | 12/2011 | Dwyer | G06T 11/206 715/854 |
| 2012/0050289 | A1 * | 3/2012 | Park | G06T 17/005 345/426 |
| 2014/0358960 | A1 * | 12/2014 | Levi | G06F 17/30495 707/769 |

OTHER PUBLICATIONS

Ramasubramanian, V.; Paliwal, Kuldip K. Fast k-dimensional tree algorithms for nearest neighbor search with application to vector quantization encoding. Signal Processing, IEEE Transactions on, 1992, vol. 40(3): 518-531. doi: 10.1109/78.120795.
Zaklouta, Falin; Stanciulescu, Bogdan; Hamdoun, Omar. Traffic sign classification using kd trees and random forests. In: Neural Networks (IJCNN), The 2011 International Joint Conference on. IEEE, 2011. S. 2151-2155. doi: 10.1109/IJCNN.2011.6033494.
Zaklouta, Falin; Stanciulescu, Bogdan. Real-time traffic-sign recognition using tree classifiers. Intelligent Transportation Systems, IEEE Transactions on, 2012, vol. 13(4): 1507-1514. doi: 10.1109/TITS.2012.2225618.
Jerome H. Friedman, Jon Louis Bentley, Raphal Ari Finkel; "An Algorithm for Finding Best Matches in Logarithmic Expected Time"; ACM Transactions on mathematical Software, vol. 3, No. 3, Sep. 1977, pp. 209-226.
Chanop Silpa-Anan, Richard Hartley; "Localisation Using an Image-Map".

(Continued)

*Primary Examiner* — Gregory M Desire
(74) *Attorney, Agent, or Firm* — Quinn Law Group, PLLC

(57) ABSTRACT

A system includes a transceiver, processor, database, and memory. Instructions for executing a nearest neighbor search are recorded in memory. Receipt of a query point by the transceiver from a camera or other input device causes the processor to construct a KD-Fern having nodes as an ordered set of splitting dimensions and thresholds. All nodes at the same level of the KD-Fern have the same splitting dimension $d$ and the same threshold $\tau$. A binary bit is generated at each node describing a respective threshold comparison decision for that particular node. The processor associates each of a plurality of binary addresses in the binary map with a corresponding nearest neighbor index, determines the binary address of the query point, and returns, e.g., to a vehicle braking, steering, or body control module, a nearest neighbor result by extracting the nearest neighbor from the binary map.

19 Claims, 2 Drawing Sheets

(56) References Cited

OTHER PUBLICATIONS

Keinosuke Fukunaga, Patrenahalli M. Narendra: "A Branch and Bound Algorithm for Computing k-Nearest Neighbors"; IEE Transactions on Computers Jul. 1975.

Mustafa Ozuysal, Pascal Fua, Vincent Lepetit; "Fast Keypoint Recognition in Ten Lines of Code" Computer Vision Laboratory.

Chanop Silpa-Anan, Richard Hartley; "Optimised KD-trees for Fast Image Descriptor Matching".

Jagan Sankaranarayanan, Hanan Samet, Amitabh Varshney; "A Fast All Nearest Neighbor Algorithm for Applications Involving Large Point-Clouds"; Computers & Graphics 31; 2007; pp. 157-174.

Marius Muja, David G. Lowe; "Fast Approximate Nearest Neighbors with Automatic Algorithm Configuration".

* cited by examiner

RAPID NEAREST NEIGHBOR SEARCHING USING KD-FERNS

TECHNICAL FIELD

The present disclosure relates to a system and method for increasing the speed of nearest neighbor searching techniques using a KD-Ferns approach.

BACKGROUND

Nearest neighbor (NN) searching is used in various applications, including computer vision, pattern recognition, and object detection. A goal of NN searching is to find, for a given search or query point, the closest data point, in terms of Euclidian distance, among a population of data points in a reference data set. A set of vectors represents all of the possible Euclidean distances. A variant of the basic NN search is the k-NN search, in which the "k" closest vectors are found for a given query point. Alternatively, an Approximate NN (ANN) search finds a vector that is approximately as close to the query point as the closest vector.

The data points examined via NN searching techniques may be, by way of example, visual or other patterns used in object detection. Thus, NN searching is fundamental to the execution of a multitude of different pattern recognition tasks. Examples in the field of computer vision include object detection and image retrieval. In a relatively high-dimensional space, finding an exact solution requires many vector comparisons and, as a result, computation may be relatively slow when using conventional NN searching techniques.

Existing methods for increasing the speed of basic NN searching include the use of k-dimensional (KD)-Trees, Randomized KD-Trees, and Hierarchical K-means. KD-Trees in particular provide a type of space-partitioning data structure for organizing points of interest in a given dimensional space. In a typical KD-Tree algorithm, a binary tree is created in which every node of the tree has a splitting dimension and a splitting threshold. A given root cell within a dimensional space is split into two sub-cells, with the sub-cells in turn split into two more sub-cells, until no more splitting occurs. The final cells are referred to as "leaf cells". Using NN searching techniques, points on a KD Tree can be found that are nearest to a given input point, with the use of the KD Tree eliminating significant areas of the dimensional space and thus reducing the search burden. However, search speeds possible by KD-Trees and other approaches may remain less than optimal.

SUMMARY

A system and method as disclosed herein is intended to improve upon the possible search speeds of existing nearest neighbor (NN) searching techniques via the use of a technique referred to hereinafter as KD-Ferns. Example applications of the present approach may include object detection or feature identification, and thus KD-Ferns may have particular utility in robotics, autonomous driving, roadway obstacle detection, image retrieval, and other evolving pattern recognition applications.

In one embodiment, a system includes a processor, a database, and memory. The database contains a plurality of data points. Instructions for executing a nearest neighbor search are recorded in the memory. A KD-Fern is created a priori from the database of data points using an approach as set forth herein, with the created KD-Fern having a set of nodes as an ordered set of splitting dimensions and splitting thresholds. Receipt of a query data point from an input source causes execution of the instructions by the processor. All of the nodes at the same level of the prior-created KD-Fern have the same splitting dimension d and the same threshold τ. The processor also independently generates, at each of the nodes of the KD-Fern, a binary 0 or 1 bit describing a threshold decision for that particular node, and then accesses the binary map using the query point. The processor also returns a nearest neighbor result for the query point from the binary map, with the nearest neighbor being the point in the database that is closest to the query point.

An associated method includes receiving a query data point, via a transceiver, from an input device, after first constructing the above described KD-Fern. The processor independently generates, for each node of the KD-Fern, a binary (0 or 1) bit describing a respective threshold comparison decisions for that particular node, and associates each of a plurality of binary addresses in the binary map with a corresponding nearest neighbor index, i.e., with the nearest neighbor identified for any point having a given binary address. The method also includes determining the binary address of the query point, and returning a nearest neighbor result, via the transceiver, by extracting the corresponding nearest neighbor for the query point from the binary map.

A randomized KD-Ferns variant of the present approach is also disclosed herein. In this alternative approach, multiple such KD-Ferns are randomly created a priori and return together several candidate nodes for an approximate nearest neighbor. In this variant, instead of choosing the splitting dimension according to a maximal average variance, a fixed number of dimensions with maximal variance are considered, and the splitting dimension is chosen randomly from among them. An approximate nearest neighbor is returned by limiting the number of visited leaves from among the various KD-Ferns.

An example vehicle is also disclosed herein, which may include a controller, a digital camera, and the system noted above. In this embodiment, the camera is the input device to the system. The transceiver returns the nearest neighbor result for a query point to the controller after this information is extracted from the binary map. The controller, e.g., a braking, steering, or body control module, executes a control action with respect to a property of the vehicle in response to the returned nearest neighbor result. The system used in the vehicle may use the randomized KD-Ferns approach in a possible embodiment.

The above features and advantages and other features and advantages of the present invention are readily apparent from the following detailed description of the best modes for carrying out the invention when taken in connection with the accompanying drawings.

DETAILED DESCRIPTION

Figure 1:
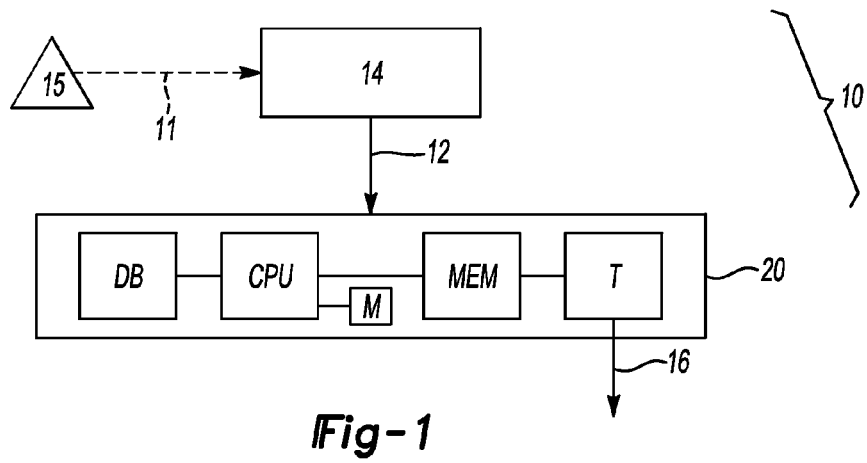
FIG. 1 is a schematic illustration of an example system for executing the KD-Ferns-based nearest neighbor (NN) search technique of the present invention.

Referring to the drawings, wherein like reference numbers refer to the same or similar components throughout the several views, FIG. 1 schematically depicts an example system 10. The system 10 is configured to execute code, via a central processing unit (CPU) from tangible, non-transitory computer-readable media or memory (MEM), so as to improve the search speed of part-based object detection methods. The KD-Ferns approach is described in detail below with reference to FIGS. 2-4, with example vehicular applications for the system 10 set forth below with reference to FIG. 5.

The system 10 shown in FIG. 1 may be embodied as one or more computers having memory, some of which is the computer-readable, tangible and non-transitory memory (MEM). Examples of memory (MEM) may include read only memory (ROM), optical memory, flash memory, and the like. The system 10 may also include transitory memory such as random access memory (RAM) and erasable electrically-programmable read only memory (EEPROM). A database (DB) of reference training points and a binary map (M), both described in more detail below, are included in the system 10 or otherwise accessible to the CPU in the execution of the KD-Ferns technique disclosed herein. Associated hardware may also be included in the system 10, such as a high-speed clock, analog-to-digital (A/D) circuitry, digital-to-analog (D/A) circuitry, and any required input/output (I/O) circuitry and devices, including a transceiver (T) as shown, as well as signal conditioning and buffer electronics.

Figure 2:
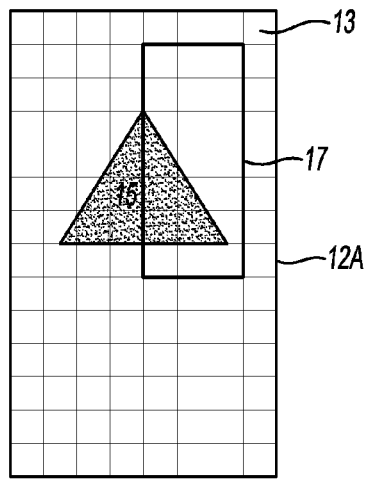
FIG. 2 is a schematic illustration of example input data to the system of FIG. 1 in the form of a training image having a selected appearance fragment.

The transceiver (T) may be used to receive input data (arrow 12) from an input source 14, for instance a digital image 12A as shown in FIG. 2 and described below. In such an embodiment, a raw image (arrow 11) of an object 15 may be captured by an input source 14, which is also shown in FIG. 2, with the input source 14 being, by way of example, a vision system in the form of an electro-optical or infrared camera. While image or other pattern recognition applications are particularly well suited to the present KD-Ferns technique, the input data (arrow 12) is not limited to image or pattern recognition. Those of ordinary skill in the art will appreciate that the KD-Ferns technique may be used to improve speeds of various other part-based object detection methods, or indeed any problem in which nearest-neighbor (NN) searching is ordinarily employed, with an output signal (arrow 16) identifying the nearest neighbor provided as a result of the KD-Ferns NN search.

Referring to FIG. 2, a non-limiting example application for the KD-Ferns technique is one in which a pattern in the input data (arrow 12) of FIG. 1 is analyzed. In this instance, the digital image 12A, which is comprised of multiple pixels 13, is captured of the object 15, for instance a vehicle, driver, obstacle, or any other feature to be recognized. An image fragment 17 may be sampled from the digital image 12 and processed via the system 10 of FIG. 1 to find the nearest neighbor for a given query point with respect to multiple candidate points in a training set. The training set forms a reference set of such data points, and may be contained within the database (DB) of FIG. 1.

The KD-Ferns technique proceeds in two stages: (I) KD-Ferns Construction, which occurs a priori before receipt of a query point, and (II) KD-Ferns/NN searching. In general terms, Stage I involves building the database (DB) of FIG. 1 from various data points (p) in an n-dimensional space. The system 10 then uses its hardware and associated logic to construct one or more KD-Ferns from the n-dimensional space as a type of decision tree, as described below with reference to FIGS. 3 and 4. The system 10 obtains a query point, for example a data point sampled from within the image fragment 17 shown in FIG. 2, and then quickly finds the closest data point in the database (DB) of FIG. 1 using the pre-constructed KD-Fern(s) from Stage I.

Unlike existing NN search techniques including KD-Trees, the KD-Ferns technique of the present invention allows each bit for the various NN decisions to be determined independently. In KD-Trees, one must first know the results of the first bit comparison that is determined in order to proceed further, a requirement which can slow the KD-Trees technique when used in larger data sets. The present KD-Ferns approach also allows a user to access the pre-populated binary map (M) just one time in order to determine the nearest neighbor result for a given query point. The KD-Ferns technique simply outputs a list of dimensions (V) and corresponding thresholds ($\tau$), and given a query point, rapidly computes its location in the KD-Fern to thereby determine the nearest neighbor.

The exact NN search problem can be stated succinctly as follows: given a database of data points $P \subset \Re^k$ and a query vector $q \in \Re^k$, find arg min $p \in P \|q-p\|$. As is well known in the art, the KD-Trees data structure generates a balanced binary tree containing, as "leaves" of the KD-tree, the various training points in a populated database. Each "node" of the tree specifies an index to its splitting dimension, $d \in \{1, \ldots, k\}$, and a threshold $\tau$ defining the splitting value. This is how an n-dimensional space is partitioned, with an example shown in FIG. 3 and explained below.

Given a query q, with q(d) denoting its $d^{th}$ entry, a KD-tree is traversed in a "root to leaf" manner by computing, at each node, the binary value of q(d)>$\tau$ and then following the right-hand branch on a value of 1 and left-hand branch on a value of 0. Upon reaching a leaf dataset point, its distance to the query is computed and saved. Optionally, each traversed node defined by d, $\tau$ may be inserted to a "priority queue" with a key which equals its distance to the query: |q(d)−$\tau$|. After a leaf is reached, the KD-Trees search continues by descending in the tree from the node with the minimal key in the priority queue. The search is stopped when the minimal key in the priority queue is larger than the minimal distance found, thus ensuring an exact nearest neighbor is returned.

The KD-Ferns technique as executed by the system 10 of FIG. 1 deviates from this existing KD-Trees approach in certain critical respects, which will now be explained with reference to the two broad Stages I and II noted above.

Stage I: The KD-Ferns Construction Algorithm

Within memory (MEM) of the system 10 of FIG. 1, as part of Stage I of the presently disclosed KD-Ferns technique, the following logic may be recorded for execution in any subsequent NN search:

Input: a dataset, $P=\{pj\}_{j=1}^{N} \subset \Re^n$

Output: $((d_1,\tau_1), \ldots, (d_L,\tau_L))$: an ordered set of splitting dimensions and thresholds, $d_l \in \{1 \ldots n.\}, \tau_l \in \Re$ Initialization: l=0 (root level). To each dataset point $p \in P$, the l length binary string B(p) represents the path to its current leaf position in the constructed binary tree. Initially, $\forall p.B(p)=\phi$.

Notations: $NB(b)=|\{p|B(p)=b|\}|$ is the same # of points in the leaf with binary representation b. $p(d) \in \Re$ is the entry d of point p.

While $\exists p,q$ such that: $p \neq q$ and B(p)=B(q), do:

(1) Choose the splitting dimension with maximal average variance over current leafs:

$$d_{l+1} = \mathrm{argmax}_d \sum_{b \in \{0,1\}}^{l} \frac{N_{B(b)}}{N} \cdot \mathrm{Var}_{\{p|B(p)\}}[p(d)]$$

(2) Set Max_Entropy=0
(3) For each $\tau \in \{p(d_{l+1})|p \in P\}$ a. Set $\forall \{p \in P\}:B'(p) = [B(p), \{p(d_{l+1}) > \tau\}]$ b. Set Entropy $= -\sum_{b \in \{0,1\}}^{l+1} \frac{N_{B'(b)}}{N} \cdot \ln \frac{N_{B'(b)}}{N}$ c. If (Entropy > Max_Entropy), set $\tau_{l+1} = \tau$, set $B = B'$.

d. $l = l + 1$

The above approach allows the KD-Fern to be constructed a priori from the database (DB) of points, i.e., prior to receipt of any queries. That is, once the database (DB) has been created, the system 10 of FIG. 1 can construct the KF-Fern(s) to be used in any later NN searching applications.

KD-Ferns effectively provides a variant of the aforementioned KD-Trees search, with the following property: all nodes at the same level or depth of the KD-Fern have the same splitting dimension d and threshold τ. The search, due to its restricted form, can be implemented more efficiently than a KD-Tree search. A KD-Fern with a maximal depth L can be represented by an ordered list of dimension indexes and thresholds, $((d_1, \tau_1), \ldots, (d_L, \tau_L))$. Thus, the output of the KD-Fern may include a list of dimensions and thresholds.

As in the KD-Trees approach, each dataset point is inserted into a tree leaf. For a dataset point or node p, B(p) is a binary string defining its tree position. The KD-Ferns technique of the present invention, as executed by the system 10 of FIG. 1, considers an inverse mapping, i.e., the map (M) in FIGS. 1 and 4, and in the formula appearing below, from binary strings of length <=L to all points in P. The domain of the mapping (M) can be transformed to all binary strings of length L by concatenating shorter strings with all possible suffixes and mapping them to the same node p. Given a query q, its binary string B(q) is created by comparing it to each entry in the list, i.e., $B(q)=((q(d_1)>\tau_1), \ldots, (q(d_L)>\tau_L))$. p=M (B(q)) is the dataset point in the leaf reached with query q.

For small enough dataset sizes |P|, the entire mapping (M) can be stored in the memory (MEM) of FIG. 1, such as in a lookup table with $2^L$ entries, and computing inverse mapping can be achieved by a single access to this lookup table. A priority queue can also be efficiently implemented using known bin sorting techniques due to the limited number of possible values, L. However, a balanced tree with the KD-Ferns property does not necessarily exist, and therefore the maximal depth L is no longer logarithmic in |P|. Thus, the KD-Ferns construction algorithm noted above is required.

The original KD-Trees construction algorithm is applied recursively in each node p splitting the dataset to the created branches. For a given node p, the splitting dimension d with the highest variance is selected, and τ is set to the median value of p(d) for all dataset points in the node p. The KD-Ferns technique described above sequentially chooses the dimensions and thresholds at each level using a "greedy strategy". That is, in each level the splitting dimension is chosen to maximize the conditional variance averaged over all current nodes for increasing discrimination. The splitting threshold (T) is then chosen such that the resulting intermediate tree is as balanced as possible by maximizing the entropy measure of the distribution of dataset points after splitting.

Randomized KD-Ferns Variant

Figure 3:
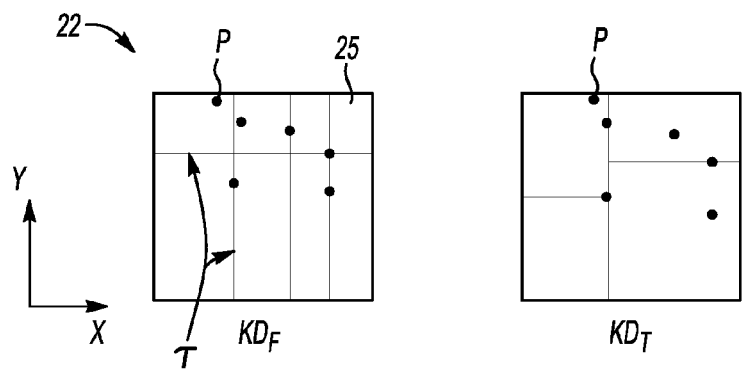
FIG. 3 is a schematic illustration of an example two-dimensional space partition using KD-Ferns in contrast with a partition provided using KD-Trees.

Referring briefly to FIG. 3, the resulting data space partition 22 for KD-Ferns ($KD_F$) is shown for an example set of six points (p) in a 2-dimensional space, i.e., n=2, alongside a KD-Tree partition ($KD_T$). The KD-Ferns approach partitions the dimensional space to orthotopes or hyper-rectangles 25. In an analogy to randomized KD-Trees, for instance, one may extend the presently disclosed technique to randomized KD-Ferns, in which several KD-ferns are constructed. Instead of choosing the splitting dimension according to maximal average variance, a fixed number of dimensions $K_d$ with maximal variance are considered, and the splitting dimension (dl) is chosen randomly from among them. An approximate nearest neighbor is returned by limiting the number of visited leaves, all of which may occur in logic of the system 10 of FIG. 1 or another similarly constructed system.

Stage II: Nearest Neighbor Searching Using KD Ferns

Figure 4:
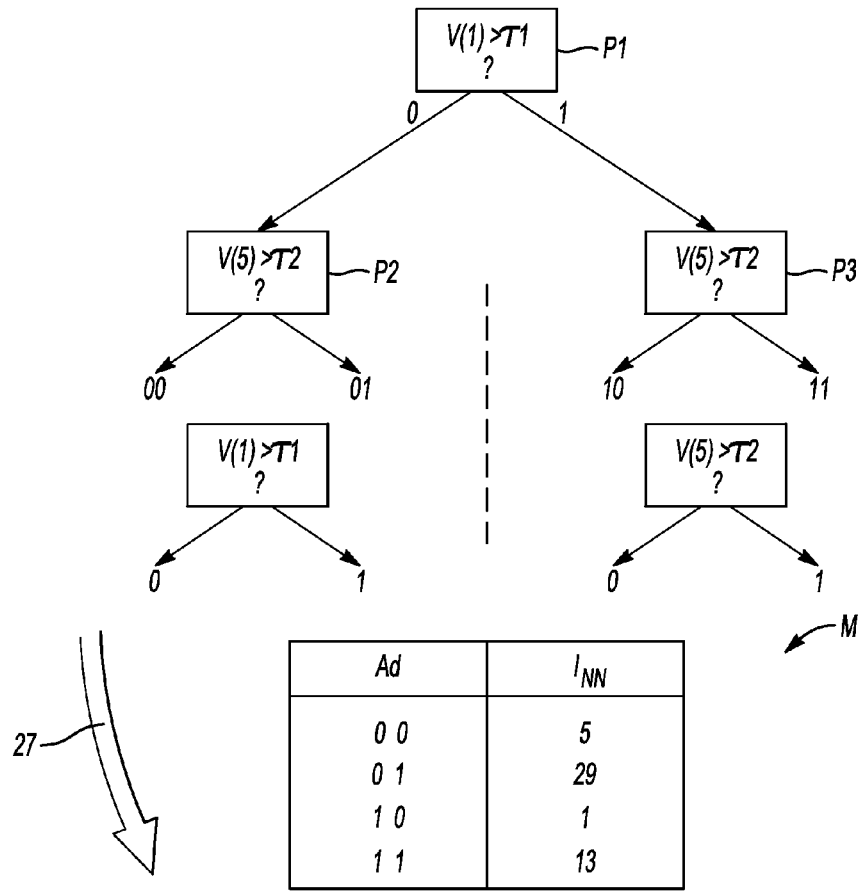
FIG. 4 is a schematic flow diagram describing application of the KD-Ferns technique.

Referring to FIG. 4, an application of the constructed KD Fern may be illustrated schematically with respect to a few sample nodes $P_1$, $P_2$, and $P_3$. Traversing down the KD Fern from its root node $P_1$ is a matter of comparing each dimension (V) of the partition 22 shown in FIG. 3 to a given threshold ($\tau_1$) and accessing the mapping or binary map (M) of FIG. 1 (arrow 27) to find the corresponding nearest neighbor index ($I_{NN}$). As part of the construction described above, the system 10 of FIG. 1 records, at each node (P), a binary string address (Ad) in the binary map (M). The string address (Ad) represents the result at the inner node, here ($P_1$), i.e., the immediately prior searched node, and the distance to the threshold (τ) is captured as a nearest neighbor index ($I_{NN}$). The nearest neighbor index ($I_{NN}$) identifies the nearest point in the database (DB) of FIG. 1 with respect to the query point, i.e., the specific point being examined.

Figure 5:
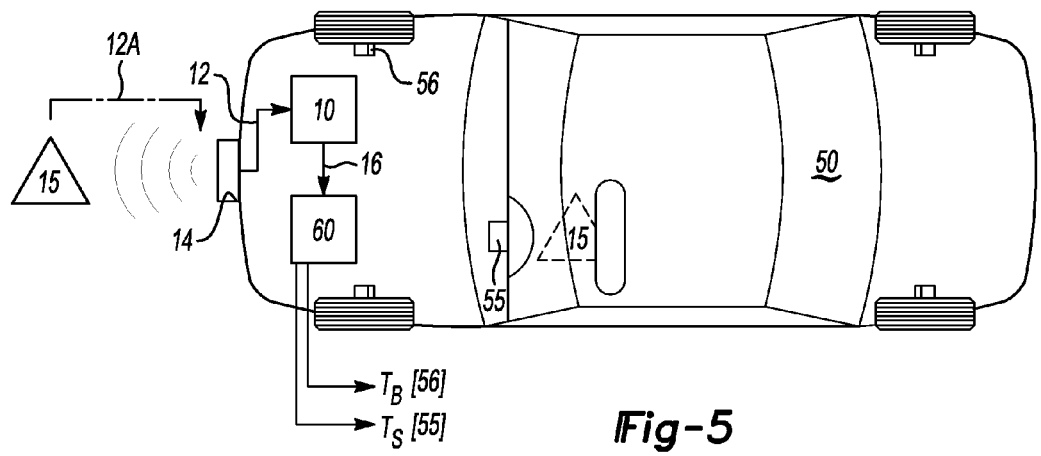
FIG. 5 is a schematic illustration of an example vehicle having the system of FIG. 1 depicting some possible applications for the KD-Ferns approach set forth herein.

Referring to FIG. 5, the KD-Ferns technique described above provides an approach for increasing the processing speed in various applications, including real-time pattern recognition techniques. This may be particularly useful, for instance, in real-time detection or recognition of objects using computer vision technologies. In a possible set of applications, for instance, the system 10 of FIG. 1 may be embedded within a vehicle 50. The object 15 in this instance may be an obstacle in the roadway, with a vehicle controller 60 receiving the output signal (arrow 16) from the system 10 as an input signal triggering a suitable control action with respect to the vehicle 50.

Example vehicle controllers 60 may include anti-lock braking system controller which automatically commands a braking torque ($T_B$) to brake actuators 56 and/or engine braking to slow the vehicle 10. Likewise, the vehicle controller 60 could be a steering system controller which commands a steering torque ($T_S$) to a steering motor 55 to thereby cause the vehicle 50 to avoid the object 15, e.g., in an autonomous vehicle.

In yet another embodiment, the vehicle controller 60 of FIG. 5 may be a body control module of the vehicle 50, which may receive the output signal (arrow 16) from the system 10 after imaging the driver of the vehicle 50, i.e., the object 15 shown in phantom in FIG. 5, with the driver being identified from a population of possible drivers, automatically, via the forgoing KD-Ferns/NN searching technique. The body control module could then automatically adjust various customizable settings within the vehicle 50, e.g., seat, pedal, or mirror positions, radio settings, HVAC settings, and the like. Other embodiments, both vehicular and non-vehicular, may be envisioned without departing from the intended inventive scope.

While the best modes for carrying out the invention have been described in detail, those familiar with the art to which this invention relates will recognize various alternative designs and embodiments for practicing the invention within the scope of the appended claims.

The invention claimed is:

1. A system comprising:
a transceiver;
a processor;
a database containing a plurality of data points;
tangible, non-transitory computer-readable memory on which is recorded instructions for executing a nearest neighbor search; and
a controller in communication with the processor;
wherein the processor is configured to construct a multi-level KD-Fern having a set of nodes as an ordered set of splitting dimensions and thresholds, wherein all of the nodes at the same level of the KD-Fern have the same splitting dimension d and the same threshold T, and wherein receipt of a query point by the transceiver from an input device causes the processor device, via execution of the instructions by the processor, to:
independently generate, for each of the nodes of the KD-Tree, a binary (0 or 1) bit describing a respective threshold comparison decision for that particular node;
associate each of a plurality of binary addresses in the binary map with a corresponding nearest neighbor index;
determine the binary address of the query point; and
return a nearest neighbor result to the controller, via the transceiver, by extracting the corresponding nearest neighbor for the query point from the binary map, and wherein the controller is configured to execute a control action with respect to the system in response to the received nearest neighbor result.

2. The system of claim 1, wherein the system is configured to construct a plurality of the KD-ferns, randomly select a splitting dimension from among a fixed number of dimensions with a maximal variance, and return an approximate nearest neighbor result as the nearest neighbor result.

3. The system of claim 1, wherein the binary map includes a plurality of binary strings each of length L recorded in a lookup table having 2L entries, and wherein the binary map is accessed just one time during execution of the nearest neighbor search in order to determine the nearest neighbor result for the query point.

4. The system of claim 1, wherein the input device is a camera operable to output a digital image, and wherein the processor is configured to receive, as the query point, a point in the digital image.

5. The system of claim 1, wherein the controller is a vehicle controller, and wherein the transceiver is configured to return the nearest neighbor result to the vehicle controller as an output signal.

6. The system of claim 5, wherein the vehicle controller is a braking or a steering controller operable to output a braking or steering torque, respectively, in response to the nearest neighbor result.

7. The system of claim 6, wherein the nearest neighbor result identifies a driver from among a population of drivers, and wherein the vehicle controller is body control module configured to automatically adjust a setting of one of a vehicle system in response to the nearest neighbor result to thereby match a preference of the identified driver.

8. A method comprising:
constructing a multi-level KD-Fern via a processor using data points stored in a database, wherein the KD-Fern has a set of nodes as an ordered set of splitting dimensions d and thresholds T, and wherein all of the nodes at the same level of the KD-Fern have the same splitting dimension d and the same threshold T;
receiving a query data point, via a transceiver, from an input device;
independently generating, for each of the nodes of the constructed KD-Tree, a binary (0 or 1) bit describing a respective threshold comparison decision for that particular node;
associating each of a plurality of binary addresses in the binary map with a corresponding nearest neighbor index;
determining the binary address of the query point; and
returning a nearest neighbor result to an external device, via the transceiver, by extracting the corresponding nearest neighbor for the query point from the binary map; and
executing a control action with respect to a system, via a controller, in response to the received nearest neighbor result.

9. The method of claim 8, wherein constructing a multi-level KD-Fern includes constructing a plurality of the KD-ferns and randomly select a splitting dimension from among a fixed number of dimensions with a maximal variance, and wherein returning a nearest neighbor result includes returning an approximate nearest neighbor result as the nearest neighbor result.

10. The method of claim 8, further comprising: recording, as part of the binary map, a plurality of binary strings each of length L in a lookup table having 2L entries, and accessing the binary map just one time during the nearest neighbor search in order to determine the nearest neighbor result for the query point.

11. The method of claim 8, wherein the input device is a camera, and wherein receiving the query point includes receiving a point in a digital image from the camera.

12. The method of claim 8, wherein the controller is a vehicle controller, and wherein returning the nearest neighbor result includes transmitting the nearest neighbor result to the vehicle controller.

13. The method of claim 12, wherein the vehicle controller is a brake or steering controller, the method further comprising: outputting a braking or a steering torque via the respective brake or steering controller.

14. The method of claim 12, wherein the vehicle controller is body control module, the method further comprising identifying a driver from a population of drivers, and then adjusting a setting of a vehicle system via the body control module in response to the NN result to thereby match a preference of the identified driver.

15. A vehicle comprising:
a controller;
a digital camera; and
a system comprising:
a transceiver;
a processor;
a database containing a plurality of data points, wherein the processor is configured to construct, using the plurality of data points in the database, a multi-level KD-Fern having a set of nodes as an ordered set of splitting dimensions d and
thresholds T, with all of the nodes at the same level of the KD-Fern have the same splitting dimension d and the same threshold T; and tangible, non-transitory computer-readable memory on which is recorded instructions for executing a nearest neighbor (NN) search;

wherein receipt of a query point by the transceiver from the digital camera causes execution of the instructions by the processor, and thereby causes the computer device to:

independently generate, for each of the nodes of the KD-Tree, a binary (0 or 1) bit describing a respective threshold comparison decision for that particular node;

associate each of a plurality of binary addresses in the binary map with a corresponding nearest neighbor index;

determine the binary address of the query point; and return a nearest neighbor result to the controller, via the transceiver, by extracting the corresponding nearest neighbor for the query point from the binary map; and wherein the controller is configured to execute a control action with respect to a property of the vehicle in response to the returned nearest neighbor result.

16. The vehicle of claim 15, wherein the controller is one of a braking controller and the property of the vehicle is a braking force applied by a set of brake actuators and a steering controller and the property of the vehicle is a steering force applied by a steering motor.

17. The vehicle of claim 15, wherein the controller is a body control module, and the property of the vehicle is an HVAC or driving position setting.

18. The vehicle of claim 15, wherein the binary map includes a plurality of binary strings each of length L and recorded in a lookup table having 2L entries, and wherein the processor accesses the binary map just one time during the nearest neighbor search in order to determine the nearest neighbor result for the query point.

19. The vehicle of claim 15, wherein the system is configured to construct a plurality of the KD-ferns, randomly select a splitting dimension from among a fixed number of dimensions with a maximal variance, and return an approximate nearest neighbor result as the nearest neighbor result.

* * * * *